United States Patent
Patadia et al.

(10) Patent No.: US 9,491,496 B2
(45) Date of Patent: Nov. 8, 2016

(54) SYSTEMS AND METHODS FOR DELIVERING CONTENT TO A MEDIA CONTENT ACCESS DEVICE

(71) Applicant: Verizon Patent and Licensing Inc., Arlington, VA (US)

(72) Inventors: Amit B. Patadia, Plano, TX (US); Lakshmi N. Chakarapani, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 11 days.

(21) Appl. No.: 14/267,731

(22) Filed: May 1, 2014

(65) Prior Publication Data

US 2015/0319505 A1 Nov. 5, 2015

(51) Int. Cl.

| | | |
|---|---|---|
| H04N 21/236 | (2011.01) | |
| H04N 21/81 | (2011.01) | |
| H04N 21/2668 | (2011.01) | |
| H04N 21/2665 | (2011.01) | |
| H04N 21/266 | (2011.01) | |
| H04N 21/858 | (2011.01) | |
| H04N 21/854 | (2011.01) | |
| H04N 21/235 | (2011.01) | |

(52) U.S. Cl.
CPC .... *H04N 21/23614* (2013.01); *H04N 21/2353* (2013.01); *H04N 21/2665* (2013.01); *H04N 21/2668* (2013.01); *H04N 21/26603* (2013.01); *H04N 21/8133* (2013.01); *H04N 21/854* (2013.01); *H04N 21/858* (2013.01); *H04N 21/8586* (2013.01)

(58) Field of Classification Search
CPC .................... H04N 21/8133; H04N 21/2353; H04N 21/26603; H04N 21/2665; H04N 21/2668; H04N 21/854; H04N 21/8586; H04N 21/23614

See application file for complete search history.

(56) References Cited

U.S. PATENT DOCUMENTS

| | | | |
|---|---|---|---|
| 7,017,173 B1* | 3/2006 | Armstrong ......... | H04N 21/2668 725/136 |
| 2007/0121678 A1* | 5/2007 | Brooks et al. ................ | 370/505 |
| 2007/0250901 A1* | 10/2007 | McIntire et al. .............. | 725/146 |
| 2011/0296458 A1* | 12/2011 | Di Mattia ........ | H04N 21/23655 725/36 |
| 2011/0321114 A1* | 12/2011 | Newell ......................... | 725/146 |
| 2013/0031579 A1* | 1/2013 | Klappert ............... | H04N 21/454 725/32 |
| 2013/0091517 A1* | 4/2013 | Ha ..................... | H04N 21/2353 725/30 |
| 2013/0347018 A1* | 12/2013 | Limp ................. | H04N 21/4826 725/19 |
| 2014/0089967 A1* | 3/2014 | Mandalia et al. .............. | 725/34 |
| 2014/0282717 A1* | 9/2014 | Hutchings .......... | H04N 21/2668 725/34 |

* cited by examiner

*Primary Examiner* — Pankaj Kumar
*Assistant Examiner* — Alexander Boyd

(57) ABSTRACT

An exemplary method includes a media content delivery system generating a supplemental content stream associated with a primary media content stream, the supplemental content stream including one or more supplemental content instances temporally aligned with one or more content moments in a media program represented by the primary media content stream, and facilitating concurrent streaming of the primary media content stream and the supplemental content stream to a media content access device, the streams configured for concurrent presentation by the media content access device in a user interface. A presentation of the supplemental content stream in the user interface may be transparent to a user during a presentation of a segment of the media program that is not part of the one or more content moments in the media program and visible to the user during the presentation of the one or more content moments in the media program.

19 Claims, 10 Drawing Sheets

SYSTEMS AND METHODS FOR DELIVERING CONTENT TO A MEDIA CONTENT ACCESS DEVICE

BACKGROUND INFORMATION

Consumers are increasingly choosing to access media programs by streaming the media programs to access devices capable of playing back the streamed media programs. Such streamed media programs may be made available for streaming through a media service that is provided by a media service provider for access by users of the media service.

A media service provider typically obtains media programs from one or more media content sources (e.g., movie studios, television studios/networks, etc.) and makes those media programs available for streaming to users of a media service. Conventionally, a media program obtained from a media content source and distributed by a media service provider is streamed to an access device in a single stream.

In certain examples, it may be desirable to provide a user of an access device with supplemental content that is associated with the media program included in the single stream. However, the media service provider is limited in how and/or to what extent the single stream may be modified due to, for example, copyrights, digital rights, and/or an agreement between the media service provider and the media content source.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
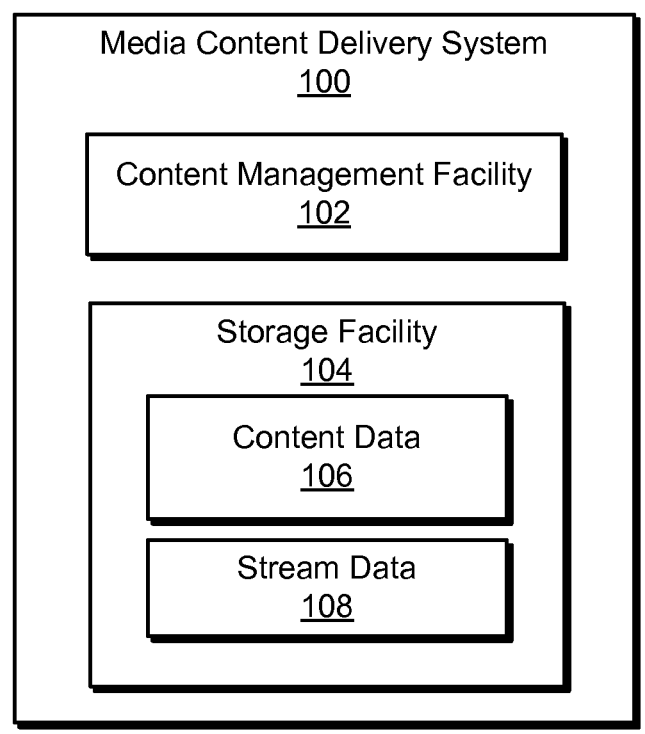
FIG. 1 illustrates an exemplary media content delivery system according to principles described herein.

Exemplary systems and methods for delivering content to a media content access device are disclosed. Systems and methods described herein may facilitate delivery of a media program and supplemental content associated with the media program to a media content access device in any of the ways described herein.

In certain systems and methods described herein, a media content delivery system may generate a supplemental content stream associated with a primary media content stream. The generating of the supplemental content stream may include identifying, based on metadata for a media program represented by the primary media content stream, one or more content moments in the media program, and creating the supplemental content stream to include one or more supplemental content instances temporally aligned with the one or more content moments.

In certain examples, the media content delivery system may facilitate concurrent streaming of the primary media content stream and the supplemental content stream to a media content access device over a network. The primary media content stream and the supplemental content stream may be configured to facilitate concurrent, temporally aligned presentation by the media content access device of the one or more supplemental content instances and the one or more content moments during a playback of the media program by the media content access device.

As used herein, a "content moment" may refer to any portion of a media program that may be used as a basis to provide supplemental content to a user. For example, content moments may be portions of a media program that are associated with any particular scenes, actors, objects, products, services, geographic locations, songs, advertisements, etc. that may be presented during streaming of the media program. Examples of content moments and how they may be identified and used as the bases to provide supplemental content are described herein.

As used herein, a "supplemental content instance" may refer to any instance of content that may be associated with a content moment identified in a media program and that may be provided to supplement the content moment. For example, supplemental content instances may include advertisements, notifications, recommendations, images, information, metadata, links to additional content, and/or any other content that may be associated with a content moment identified in a media program and that may be provided to supplement the content moment. Examples of supplemental content instances and how they may be included in a supplemental content stream and associated with content moments in a media program carried by a primary content stream are described herein.

Systems and methods described herein may facilitate a convenient, intuitive, and/or unobtrusive way for users to discover and/or otherwise experience supplemental content associated with a media program that is streamed to a media content access device. Systems and methods described herein may additionally or alternatively facilitate an effective way for media service providers and/or third parties such as advertisers to direct supplemental content to users without modifying a primary media content stream that includes a media program in order to direct the supplemental content to the users. These and/or additional or alternative benefits that may be provided by one or more of the exemplary systems and methods described herein will be made apparent herein. Exemplary systems and methods for delivering content to a media content access device will now be described in reference to the accompanying drawings.

FIG. 1 illustrates an exemplary media content delivery system 100 ("system 100"). System 100 may be configured to provide a media service and/or one or more features of a media service to one or more end users of the media service (e.g., one or more customers of the media service). The media service may include any service that provides end users of the service with one or more features and/or tools configured to facilitate user discovery, access, and/or consumption of media programs and/or supplemental content associated with the media programs. The media service may utilize or otherwise be associated with any suitable media distribution configuration. In some examples, the media service may include a media distribution system that streams media programs over a network such as the Internet. System 100 may be associated with (e.g., operated by) a provider of the media service ("service provider").

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption by way of the media service may be accessed and/or played back by an appropriately configured user computing device (e.g., a media content access device) for presentation to the user.

As shown in FIG. 1, system 100 may include, without limitation, a content management facility 102 ("management facility 102") and a storage facility 104 selectively and communicatively coupled to one another. The facilities may be communicatively coupled one to another by any suitable communication technologies.

It will be recognized that although facilities 102-104 are shown to be separate facilities in FIG. 1, facilities 102-104 may be combined into a single facility or split into additional facilities as may serve a particular implementation. Additionally or alternatively, storage facility 104 may be omitted from and external to system 100 in other implementations. Facilities 102-104 will now be described in more detail.

Storage facility 104 may be configured to store data generated and/or used by management facility 102. For example, storage facility 104 may store content data 106 representative of media programs that are discoverable and/or accessible through a media service (e.g., media programs that may be streamed to a user of the media service). Content data 106 may also represent information about the media programs. For example, content data 106 may include metadata (e.g., information about genre, cast, title, playback duration, release date, etc.) and/or enriched metadata (e.g., user-defined tags, third-party-defined tags, ratings, etc.) for the media programs.

Storage facility 104 may also store stream data 108 representative of content streams and/or information regarding content streams that may be provided to a user by way of the media service. Information regarding content streams may include any information associated with generating, storing, identifying, accessing, and/or locating content streams to be provided to a user. For example, stream data 108 may include uniform resource locator ("URL") information that may be used to facilitate a media content access device accessing content streams in order to stream the content streams to the media content access device. Storage facility 104 may maintain additional or alternative data as may serve a particular implementation.

Data stored by storage facility 104 may be accessed by system 100 from any suitable source, including a source internal or external to system 100. Storage facility 104 may permanently or temporarily store data. In certain examples, system 100 may access certain data from a source external to system 100 and temporarily store the data in storage facility 104 for use by management facility 102. In certain examples, data generated by management facility 102 may be stored permanently or temporarily to storage facility 104.

Management facility 102 may be configured to perform one or more management operations associated with delivering content to a media content access device (e.g., a set-top box device, a mobile phone device, a tablet computer, a laptop computer, a desktop computer, a smart television, etc.). Examples of such operations are described herein.

Management facility 102 may be configured to maintain a catalogue of media programs and/or otherwise facilitate access to media programs that may be streamed to a media content access device associated with a user. Management facility 102 may receive and add media programs to the catalogue in any suitable manner. For example, management facility 102 may receive media programs from one or more media content sources. A media content source may include any entity that generates, produces, and/or provides media content that may be streamed by a media service provider to users of a media service provided by the media service provider. For example, a media content source may include an individual (e.g., a user posting a user-generated media program to a media service), a movie studio, a television studio, a television network, a government entity, or any other entity that may generate, produce, and/or provide media programs for distribution by way of the media service.

In certain examples, after receiving a media program from a media content source, management facility 102 may perform one or more operations during an ingestion process to prepare the media program to be streamed to one or more users of the media service. For example, management facility 102 may prepare the media program to be streamed to a media content access device by way of a primary media content stream. In addition to including the media program, the primary media content stream may include metadata and other information (e.g., cast information, format information, etc.) associated with the media program.

In certain examples, the one or more operations may include management facility 102 preparing the media program to be streamed to a user as an on-demand asset. For example, management facility 102 may receive a media program from a media content source and may facilitate storing (e.g., through storage facility 104) the media program in the catalogue as an on-demand asset to be streamed to a media content access device associated with a user at a later time.

Additionally or alternatively, the one or more operations may include management facility 102 facilitating the streaming of a live content stream as the primary media content stream to a media content access device. For example, management facility 102 may receive a live content stream from a media content source. Management facility 102 may then facilitate distribution of the live content stream to a media content access device associated with a user in any suitable manner.

In certain examples, the one or more operations may include management facility 102 preparing the media program to be streamed to one or more types of media content access devices and/or over one or more types of network connections. For example, management facility 102 may prepare one or more primary content streams that include the media program and that are configured to be streamed and/or processed by media content access devices at one or more bitrates, at one or more resolutions, in one or more media formats, by one or more types of media players (e.g., video codecs), etc.

Management facility 102 may provide one or more tools to facilitate a user selecting a media program to be streamed to a media content access device by way of the media service. Management facility 102 may provide the one or more tools in any suitable manner. For example, management facility 102 may be configured to provide a website, a client application user interface (e.g., a user interface provided by a client application such as a "mobile app" installed and running on a media content access device), a media player user interface, a graphical user interface, and/or any other form of user interface configured to facilitate user interaction with the media service. Through such tools, a user may select a media program to be streamed to a media content access device by way of the media service.

In response to a selection of a media program by the user, management facility 102 may facilitate streaming the media program to a media content access device associated with the user by way of the primary media content stream. Management facility 102 may facilitate streaming the media program to the media content access device in any suitable manner. For example, management facility 102 may facilitate streaming the media program to a media content access device as a live content stream, a unicast stream, a multicast stream, an on-demand stream, an over-the-top ("OTT") stream, or in any other manner as may suit a particular implementation.

It may be desirable to provide a user with supplemental content associated with the media program included in the primary media content stream in a manner that does not result in legal and/or digital rights management issues. To facilitate providing such supplemental content, management facility 102 may be configured to generate a supplemental content stream associated with the primary media content stream. Management facility 102 may generate the supplemental content stream in any suitable manner and at any suitable time.

In certain examples, management facility 102 may generate the supplemental content stream during an ingestion process that may occur when management facility 102 receives a media program from a media content source. The ingestion process may include receiving data representative of the media program in any suitable form, such as in a primary media content stream or in another suitable data structure. In certain examples, the ingestion process may include the generation (e.g., by management facility 102 in certain implementations) of a primary media content stream that carries the media program based on the data representative of the media program received from the media content source. Alternatively, management facility 102 may generate the supplemental content stream after the ingestion process or at any other suitable time.

In certain examples, management facility 102 may generate a supplemental content stream by identifying, based on metadata for a media program represented by a primary media content stream, one or more content moments in the media program. Management facility 102 may access the metadata used to identify the one or more content moments in the media program in any suitable manner. In some examples, management facility 102 may access metadata included in the primary media content stream as it is provided, for example, by a media content source. Additionally or alternatively, management facility 102 may access metadata provided in an index file that may be provided together with the primary media content stream. In other examples, management facility 102 may access metadata that may be pre-generated, in any suitable manner, either by management facility 102 and/or by a third party (e.g., an advertiser and/or a media metadata service provider). The metadata may include any information that may be used to identify the one or more content moments in the media program included in the primary media content stream. Specific examples of content moments and how they may be identified based on metadata are provided herein.

Each content moment identified in a media program may be associated with a specific time during the media program. Accordingly, in identifying the one or more content moments, management facility 102 may also be configured to identify a time point at which each of the one or more content moments occurs during the media program (e.g., during a playback of the media program). Alternatively, each content moment identified in a media program may be associated with a time period during the media program (e.g., during a playback of the media program). The time period associated with a particular content moment may begin before the occurrence of the particular content moment and/or extend after the occurrence of the particular content moment.

In generating the supplemental content stream, management facility 102 may create the supplemental content stream to include one or more supplemental content instances. The one or more supplemental content instances may include any instance(s) of supplemental content that may be associated with the content moment identified in the media program.

Management facility 102 may select the one or more supplemental content instances for inclusion in the supplemental content stream in any suitable manner. For example, management facility 102 may select a supplemental content instance based on any suitable information (e.g., metadata) associated with a content moment, such as information associated with who is depicted during the content moment (e.g., cast members included in the content moment), what is depicted during the content moment (e.g., products, subject matter, etc. included in the content moment), where the content moment is depicted (e.g., a geographic location associated with the content moment), when the content moment is depicted (e.g., a time of day, time era, etc. associated with the content moment), etc. Additionally or alternatively, management facility 102 may select a supplemental content instance based on a target user or group of users that may be interested in the supplemental content instance. Specific examples of supplemental content instances and how they may be associated with content moments and selected for inclusion in a supplemental content stream are provided herein.

The supplemental content instances may be included in the secondary content stream such that the supplemental content instances are temporally aligned with corresponding content moments of a media program included in the primary media content stream. To accomplish this, management facility 102 may insert the one or more supplemental content instances into the supplemental content stream at a corresponding time point such that the one or more supplemental content instances are temporally aligned with the one or more content moments during a playback of the media program by a media content access device. In this manner or a similar manner, the supplemental content instances in the supplemental content stream may be temporally keyed to the content moments in the primary media content stream.

Management facility 102 may generate one or more supplemental content streams for a given primary media content stream. For example, in addition to generating a first supplemental content stream for a primary media content stream, management facility 102 may generate an additional supplemental content stream that may also include supplemental content instances that are temporally aligned with content moments in the primary media content stream. The additional supplemental content stream may be generated in any suitable manner, such as described herein. When more than one supplemental content stream is generated for a primary media content stream, management facility 102 may select, from the group of supplemental content streams for the primary media content stream, any of the supplemental streams for streaming together with the primary media content stream. For example, management facility 102 may access information associated with a user (e.g., profile information, activity history, settings information, etc.) to select which supplemental content stream(s) to provide to the user together with the primary media content stream. Any suitable number of supplemental content streams may be concurrently streamed together with the primary media content stream as may suit a particular implementation.

In certain examples, management facility 102 may generate a plurality of supplemental content streams that are directed to at least one of a particular user, a group of users, a class of users, a gender of a user, an age demographic of users, etc. For example, management facility 102 may generate a first supplemental content stream that is directed to a first defined class of users, a second supplemental content stream that is directed to a second defined class of users, and a third supplemental content stream that is directed to a third defined class of users. Management facility 102 may then select one or more of the first, second, and third supplemental content streams to concurrently stream together with a primary media content stream. Management facility 102 may make such a selection by detecting, in any suitable manner, whether a user of a media content access device belongs to the first, second, and/or third defined classes of users.

To illustrate, management facility 102 may identify an advertisement as a content moment in a media program included in a primary media content stream. Management facility 102 may also identify a plurality of supplemental content instances in the form of supplemental advertisements, any of which may be selected to be provided together with the advertisement in the media program based on, for example, a gender of the user associated with the media content access device. Accordingly, management facility 102 may generate a first supplemental content stream and a second supplemental content stream that may be concurrently streamed together with the primary media content stream. The first supplemental content stream may include a supplemental content instance in the form of a first supplemental advertisement that is temporally aligned with the content moment advertisement included in the primary media content stream. The first supplemental advertisement may be targeted towards men. The second supplemental content stream may include a supplemental content instance in the form of a second supplemental advertisement that is temporally aligned with the content moment advertisement included in the primary media content stream. The second supplemental advertisement may be targeted towards women. Management facility 102 may determine, in any suitable manner, the gender of the user of the media content access device (e.g., by accessing user profile information, etc.). Based on the determined gender, management facility 102 may selectively facilitate concurrent streaming of either the first or the second supplemental content stream together with the primary media content stream to provide either the first or the second supplemental advertisement to the user.

In certain examples, management facility 102 may pre-generate one or more supplemental content streams prior to receiving a request from a user to stream a media program. The supplemental content stream may be pre-generated in any suitable manner. For example, a general-use supplemental content stream for a media program may be generated by management facility 102 during the ingestion process. Additionally or alternatively, one or more specific types of supplemental content streams may be pre-generated. For example, management facility 102 may pre-generate a "shopping" type supplemental content stream that may include supplemental content instances configured to facilitate users purchasing items similar to those depicted in the media program. Additionally or alternatively, management facility 102 may pre-generate an "action" type supplemental content stream that may include information and/or content associated with actions that may occur in the media program (e.g., a car chase scene, etc.). Additionally or alternatively, management facility 102 may pre-generate a "guy" type supplemental content stream that may include supplemental content instances that may be of interest to men. Additionally or alternatively, management facility 102 may pre-generate a "girl" type supplemental content stream that may include supplemental content instances that may be of interest to a woman. Additionally or alternatively, one or more user-specific supplemental content streams may be pre-generated for a specific user and/or group of users. The preceding examples are provided for illustrative purposes only. Other supplemental content streams may be generated as may suit a particular implementation.

In certain examples, management facility 102 may dynamically generate a supplemental content stream in response to receiving a request from a user to stream a media program. Management facility 102 may dynamically generate the supplemental content stream in any suitable manner. For example, after receiving a request from a user to stream a media program, management facility 102 may access and use any suitable information associated with the user to dynamically generate the supplemental content stream on-the-fly in real time. Such information may include user profile information, purchase history information, viewing history information, settings information, and/or any other suitable information associated with the user. Management facility 102 may use the information associated with the user in any suitable way to generate the supplemental content stream, such as by using the information to identify content moments and supplemental content instances that are of potential interest to the user. Based on such information, management facility 102 may dynamically generate a supplemental content stream that is specifically tailored to the user.

Management facility 102 may be configured to facilitate concurrent streaming of a primary media content stream and a supplemental content stream to a media content access device over a network. Management facility 102 may facilitate the concurrent streaming of the primary media content stream and the supplemental content stream in any suitable manner. For example, management facility 102 may provide URLs to the media content access device that the media content access device may use to access the primary media content stream and the supplemental content stream. The media content access device may then receive both the primary media content stream and the supplemental content stream at the same time. Because the one or more supplemental content instances in the supplemental content stream are temporally aligned with the one or more content moments in the media program included in the primary media content stream, the primary media content stream and the supplemental content stream may be configured to facilitate concurrent, temporally aligned presentation by the media content access device of the one or more supplemental content instances and the one or more content moments during a playback of the media program by the media content access device.

Figure 2:
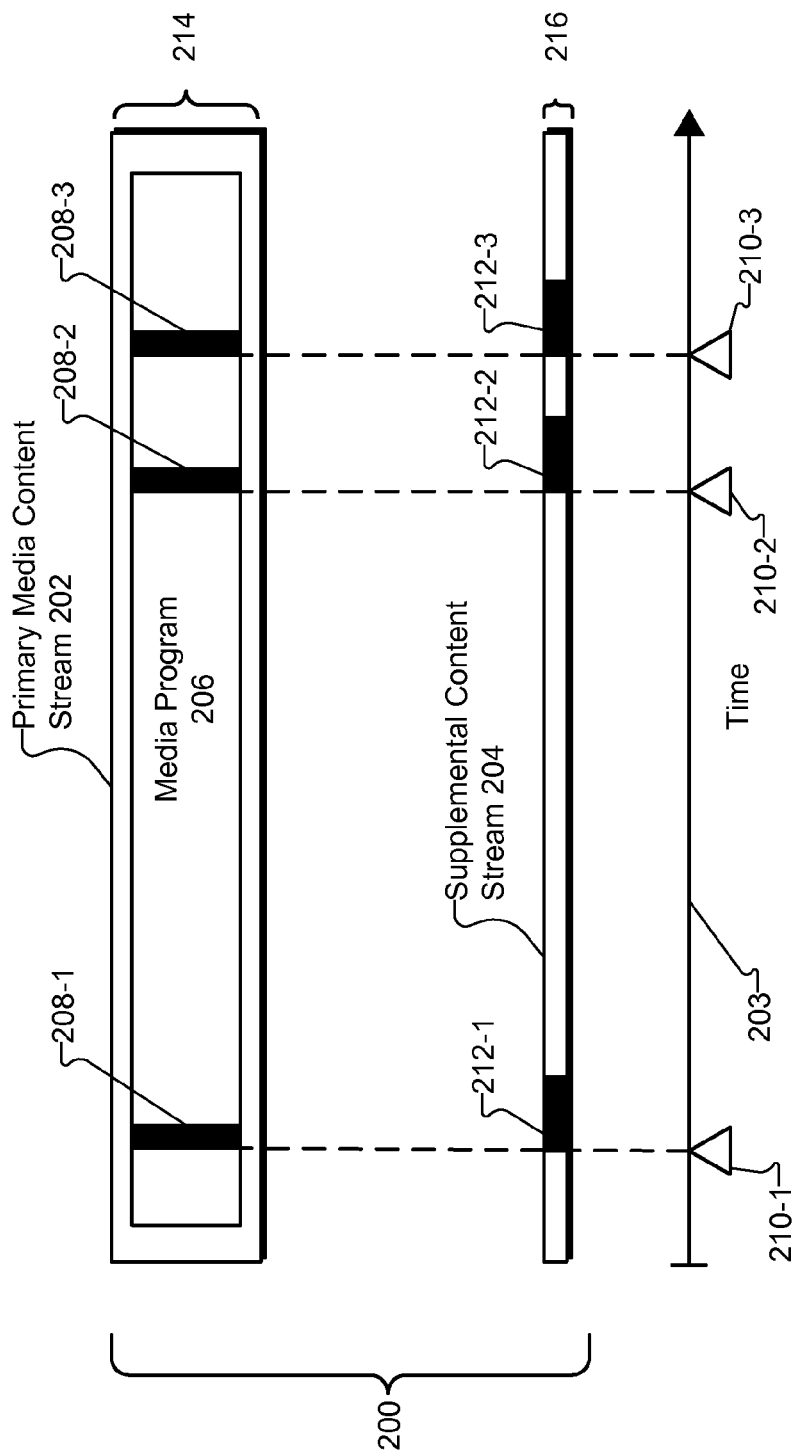
FIGS. 2-3 illustrate exemplary content streaming configurations according to principles described herein.

To illustrate, FIG. 2 shows an exemplary content streaming configuration 200 that depicts how a primary media content stream 202 may be streamed concurrently along a time axis 203 together with a supplemental content stream 204. As shown in FIG. 2, a media program 206 may be represented in (e.g., carried in) primary media content stream 202. The media program 206 may include content moments 208 (e.g., content moments 208-1 through 208-3) that may be presented at specific times in media program 206. As illustrated in FIG. 2, the content moments 208 may be associated with specific time points 210 (e.g., time points 210-1 through 210-3) along the time axis 203.

As further shown in FIG. 2, supplemental content stream 204 may include supplemental content instances 212 (e.g., 212-1 through 212-3) that are temporally aligned with content moments 208 and time points 210 of primary media content stream 202. In the example illustrated in FIG. 2, the start of content moments 208 and the start of supplemental content instances 212 are each temporally aligned at a respective time point 210. This is illustrative only. Supplemental content instances 212 may be temporally aligned with content moments 208 in any other suitable way. In certain temporal alignments, a start point of a supplemental content instance 212 may be offset from a time point 210 of a content moment 208 such that a presentation of the supplemental content instance 212 is configured to begin at an offset from (e.g., earlier or later in time by the offset) a presentation of the content moment 208.

To illustrate an example, a content moment included in a media program may present an advertisement opportunity to a user. The advertisement opportunity may be associated with anything that is depicted in the media program provided by way of a primary media content stream. For example, the metadata associated with media program 206 may indicate that an actor is wearing a particular piece of clothing at time point 210-1 that may be of interest to a user. Accordingly, management facility 102 may identify, based on the metadata, content moment 208-1 as corresponding to a scene in media program 206 in which the actor is wearing the particular piece of clothing. Based on this identification, the generation of supplemental content stream 204 may include management facility 102 inserting supplemental content instance 212-1 in supplemental content stream 204, where supplemental content instance 212-1 includes advertising information (e.g., price information, availability information, etc.) and/or one or more tools (e.g., a hyperlink, a "like" option, a "remind-me-later" option, etc.) that may facilitate a user accessing further information about the piece of clothing. Accordingly, when a user is consuming media program 206 during a playback of primary media content stream 202, the user may view the scene beginning at time point 210-1 and be concurrently presented with the advertising information associated with the piece of clothing by way of supplemental content instance 212-1 during a concurrent playback of supplemental content stream 204.

In another example, a content moment may present an opportunity for a user to receive a recommendation to explore additional content associated with the media program. For example, metadata associated with media program 206 may indicate that time point 210-2 corresponds to a portion of media program 206 in which a natural disaster is depicted and/or described. Accordingly, management facility 102 may identify, based on the metadata, content moment 208-2 as corresponding to a part in media program 206 in which a natural disaster is depicted. Management facility 102 may generate supplemental content stream 204 such that supplemental content instance 212-2 may include information associated with additional content (e.g., news reports, documentaries, follow up stories, etc.) and/or one or more tools that may facilitate a user accessing the additional content associated with the natural disaster. Accordingly, when a user is consuming media program 206 during a playback of primary media content stream 202, the user may, for example, view a depiction of the natural disaster beginning at time point 210-2 and be concurrently presented with a recommendation to explore additional content associated with the natural disaster by way of supplemental content instance 212-2 during a concurrent playback of supplemental content stream 204.

In another example, a content moment may present an opportunity to provide further information about a media program. For example, the metadata associated with media program 206 may indicate that there is additional information available about how media program 206 was produced. Accordingly, management facility 102 may identify, based on the metadata, content moment 208-3 as being a time during media program 206 in which a user may be interested in receiving information about a production of media program 206 (e.g., how long media program 206 took to make, where media program 206 was made, etc.). Accordingly, when a user is consuming media program 206 during a playback of primary media content stream 202, the user may experience content moment 208-3 beginning at time point 210-2 and be concurrently presented with the information about the production of the media program by way of supplemental content instance 212-2 during a concurrent playback of supplemental content stream 204.

The preceding examples are provided for illustrative purposes only. Any other number and/or type of content moments may be identified and may be associated with any other supplemental content instances as may suit particular implementations.

In certain examples, it may be desirable to make a supplemental content stream a low bandwidth stream to minimize possible bandwidth usage associated with streaming a media program by way of the media service. To illustrate, in the example shown in FIG. 2, a vertical thickness 214 of primary media content stream 202 may represent an amount of bandwidth allocated to primary media content stream 202, and a vertical thickness 216 of supplemental content stream 204 may represent an amount of bandwidth allocated to supplemental content stream 204. As shown in FIG. 2, supplemental content stream 204 may be allocated relatively less bandwidth than primary media content stream 202, and significantly less bandwidth than primary media content stream 202 in some implementations.

In certain examples, a supplemental content stream may be a blank stream containing blank stream content (e.g., with no payload or virtually no payload) configured to use less than a predetermined amount of bandwidth outside of time period associated with supplemental content instances included in the supplemental content stream. In such examples, management facility 102 may be configured to dynamically adjust an allocation of bandwidth to the supplemental content stream while a supplemental content stream is streamed to a media content access device. This may be accomplished in any suitable manner. For example, management facility 102 may dynamically increase bandwidth allocated to the supplemental content stream at a start of a time period associated with a supplemental content instance and dynamically decrease bandwidth allocated to the supplemental content stream at an end of the time period associated with the supplemental content instance.

Figure 3:
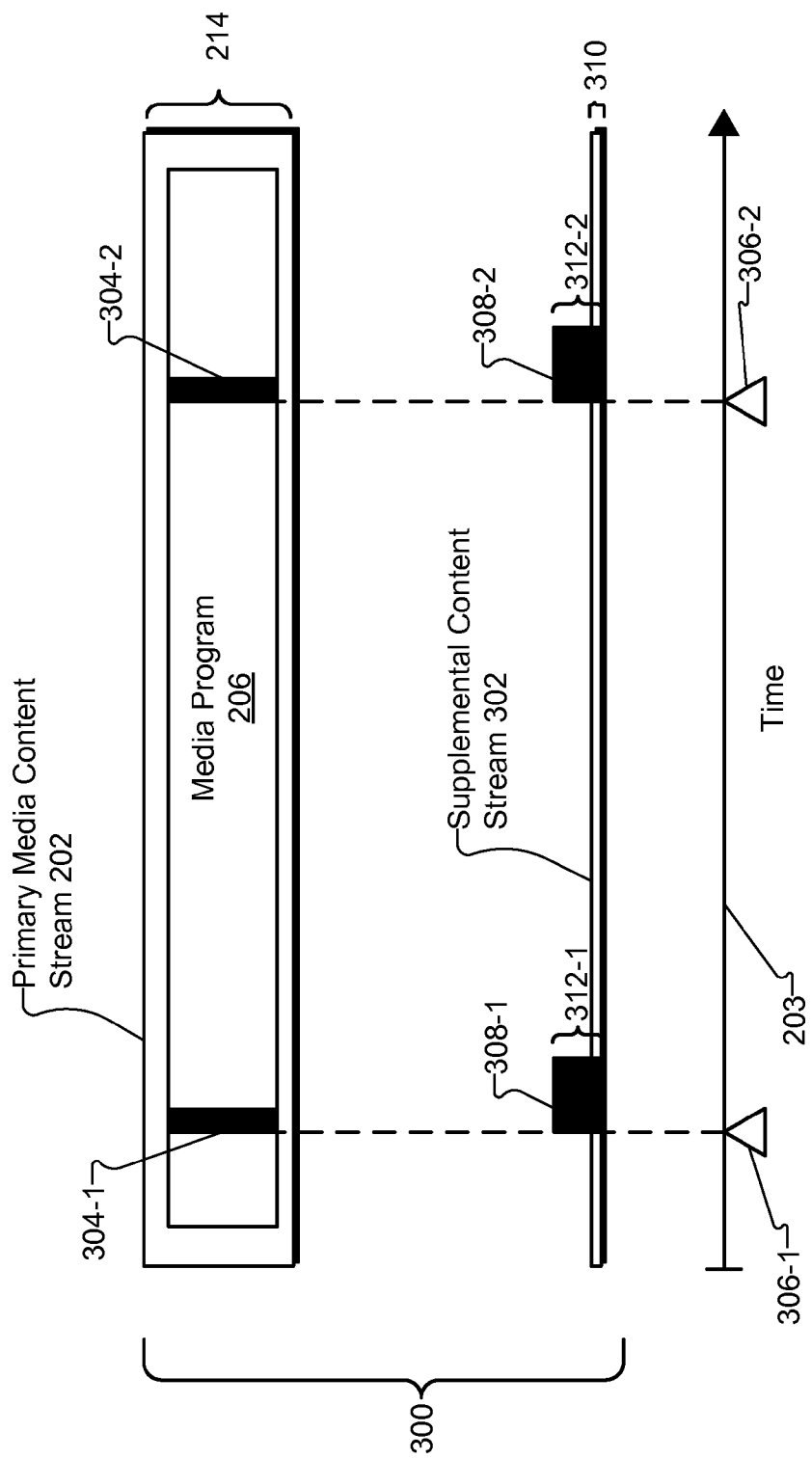

To illustrate, FIG. 3 shows an exemplary content streaming configuration 300 in which primary media content stream 202 is streamed concurrently along time axis 203 together with a supplemental content stream 302. As shown in FIG. 3, media program 206 included in primary media content stream may include content moments 304 (e.g., content moments 304-1 through 304-2) that are positioned at time points 306 (e.g., 306-1 and 306-2) along time axis 203. Supplemental content stream 302 may include supplemental content instances 308 (e.g., 308-1 and 308-2) that are temporally aligned with content moments 304 at time points 306.

Supplemental content stream 302 may be a substantially blank stream having a nominal vertical thickness 310 representative of an allocation of bandwidth to the supplemental content stream 302 during time periods outside of supplemental content instances 308. In the example shown in FIG. 3, when a presentation of the media program reaches time point 306-1, management facility 102 may dynamically increase the bandwidth allocated to supplemental content stream 302. After presentation of the content associated with supplemental content instance 308-1, management facility 102 may dynamically decrease the bandwidth allocated to supplemental content stream 302. In the example illustrated in FIG. 3, a vertical thickness 312 (e.g., 312-1 and 312-2) of supplemental content instances 308 may represent the increased bandwidth in supplemental content stream 302. When the playback time of the media program reaches time point 306-2, management facility 102 may dynamically increase the bandwidth again to accommodate content represented by supplemental content instance 304-2. After presentation of the content associated with supplemental content instance 304-2, management facility 102 may dynamically decrease the bandwidth allocated to supplemental content stream 302.

While FIG. 3 illustrates that the increase in allocated bandwidth for supplemental content stream 302 occurs at the start of, for example, a time point 306-1 corresponding to a start of supplemental content instance 308-1, in certain examples management facility 102 may dynamically increase the bandwidth of supplemental content stream 302 at any time as may suit a particular implementation. For example, management facility 102 may dynamically increase the bandwidth of supplemental content stream 302 a predetermined amount of time prior to time point 306-1. Similarly, management facility 102 may dynamically decrease the bandwidth of supplemental content stream 302 a predetermined amount of time after an end of supplemental content instance 308-1.

Returning to FIG. 1, in certain examples, management facility 102 may be configured to facilitate access to content associated with a supplemental content instance based on a user selection of the supplemental content instance. Management facility 102 may facilitate access to the content in any suitable manner. In certain examples, management facility 102 may provide a user interface including one or more tools through which users may access and interface with the media service provided by system 100 to access and use features of the media service to discover, access, and/or consume media programs and/or supplemental content associated with the media programs. The user interface may be in any suitable form. For example, management facility 102 may be configured to provide a website, a client application user interface (e.g., a user interface provided by a client application such as a "mobile app" installed and running on a media content access device), a media player user interface, a graphical user interface, and/or any other form of user interface configured to facilitate user interaction with the media service. Management facility 102 may be configured to provide, for display, any of the exemplary user interfaces illustrated herein, including one or more media service user interface views that include user interface features associated with discovering and/or accessing media programs streamed by way of a primary media content stream (e.g., primary media content stream 206) and/or supplemental content streamed by way of a supplemental content stream (e.g., supplemental content stream 204).

Figure 4:
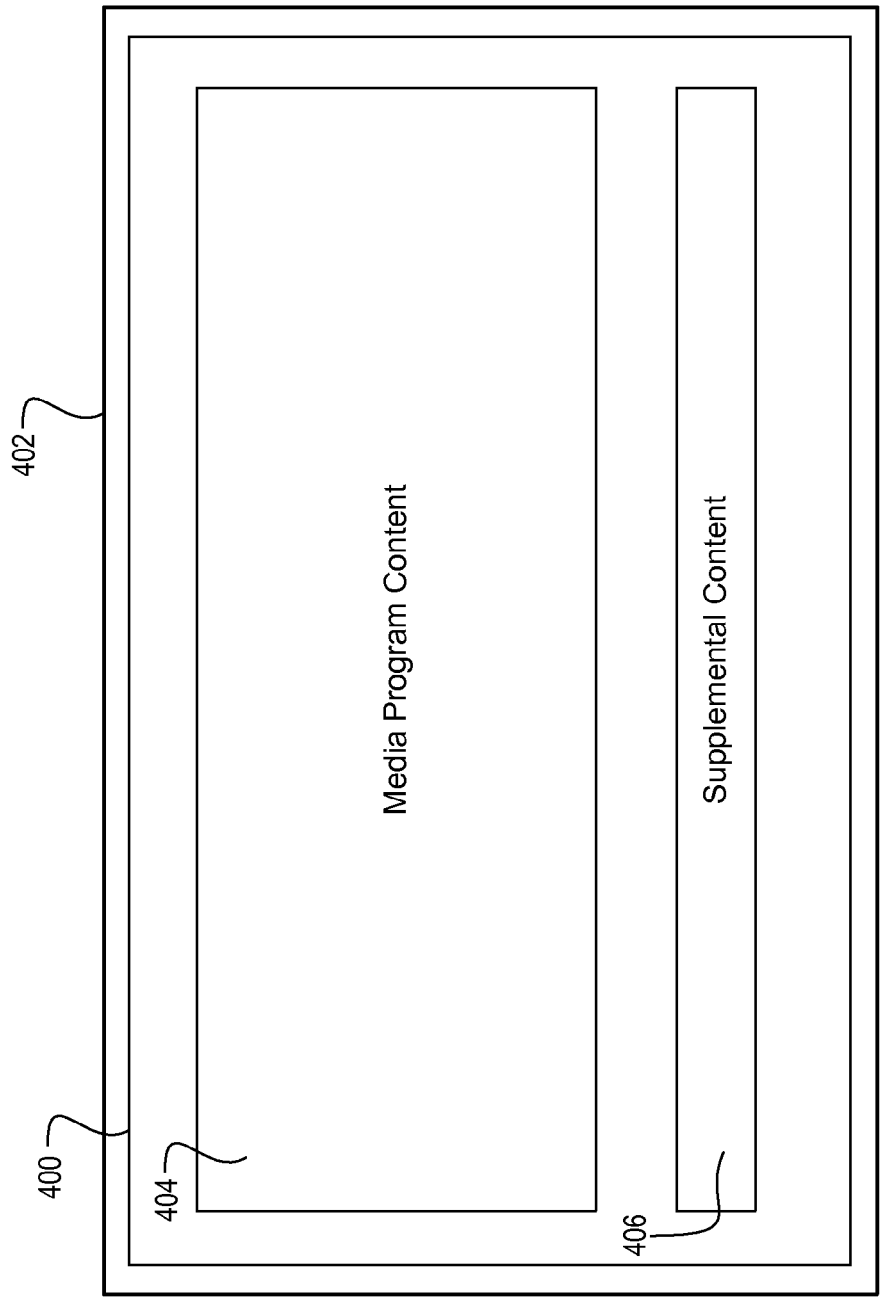
FIGS. 4-5 illustrate exemplary user interface views according to principles described herein.

To illustrate, FIG. 4 depicts a graphical user interface view 400 ("view 400") that may be provided for display by management facility 102. View 400 may be provided for display on a display screen 402 that may be associated with a media content access device. As seen in FIG. 4, view 400 may include a media program content section 404 in which a media program represented by a streamed primary media content stream may be presented. View 400 may also include a supplemental content section 406 in which supplemental content instances represented by a streamed supplemental content stream may be presented to a user concurrently with presentation of the media program. Media program content section 404 and supplemental content section 406 may be provided together as illustrated in FIG. 4, or in any other suitable on-screen configuration.

During a presentation of a media program in media program content section 404 of view 400, the presentation of the media program may reach a time point in the media program that is associated with a content moment. At this time point, a corresponding supplemental content instance may be presented in supplemental content section 406 of view 400 in any suitable manner. For example, the supplemental content instance may be displayed in supplemental content section 406 for a certain amount of time (e.g., during a time period of the content moment) and then may be removed from supplemental content section 406. Afterwards, additional supplemental content may not be presented in supplemental content section 406 until the next content moment occurs in the presentation of the media program. In this manner or a similar manner, a presentation of the supplemental content stream in a user interface may be transparent to a user during presentation of segments of the media program that are not part of the one or more content moments in the media program and visible to the user during presentation of the one or more content moments in the media program.

The supplemental content instance displayed in supplemental content section 406 may be displayed as an advertisement, a user-selectable link, a text notification, or in any other suitable manner. A user may interact with the supplemental content instance displayed in supplemental content section 406 in a number of different ways. For example, the user may provide input, in any suitable manner, to request to view additional content associated with the supplemental content instance while the media program continues to be presented in media program content section 404. Alternatively, the user may choose to wait until after presentation of the media program to access and/or experience the additional content associated with the supplemental content instance. Alternatively, the user may choose to ignore the supplemental content instance, which may only appear in supplemental content section 406 for a brief amount of time and then may disappear from supplemental content section 406.

In certain examples, a supplemental content instance presented in supplemental content section 406 may facilitate a user adding an item to a shopping cart while the media program is being presented in media program content section 404. The user may then purchase the item at a later time from any access point (e.g., television platform, mobile platform, Web platform, etc.). For instance, the user may purchase the item from a web portal in certain examples. To illustrate, the supplemental content instance presented in supplemental content section 406 may include a notification indicating that a jacket currently worn by an actor in the media program may be purchased by the user. The user may then add the jacket to the shopping cart through any suitable user input associated with supplemental content section 406. After viewing the media program, the user may access, for example, a web portal to complete the purchase of the jacket.

In certain examples, a user may want to access additional content associated with a supplemental content instance presented in supplemental content section 406 instead of continuing playback of the media program. To this end, in certain examples, management facility 102 may stop playback of the media program by way of a media content access device based on a user selection of a supplemental content instance. Management facility 102 may stop the playback and resume the playback of the media program in any suitable manner. For example, management facility 102 may store a playback position of the media program, in any suitable manner, so that the user may resume playback of the media program after accessing the additional content associated with the supplemental content instance. After stopping the playback of the media program, management facility 102 may also be configured to facilitate a presentation of the additional content associated with the supplemental content instance by way of the media content access device in any suitable manner. For example, the additional content associated with the supplemental content instance may be presented in view 400 in any suitable manner (e.g., in media program content section 404 and/or supplemental content section 406) or in any other suitable user interface view. After facilitating presentation of the additional content associated with the supplemental content instance, management facility 102 may be configured to facilitate resumption of the playback of the media program by way of the media content access device in any suitable manner.

To illustrate an example, a user may be watching a movie presented in media program content section 404. At a certain point in the movie, an actor may appear, which appearance may be identified as a content moment by management facility 102. When the actor appears, a notification may appear in supplemental content section 406 indicating that a video segment associated with the actor is available. The user may, through any suitable user input, select to view the video segment associated with the actor. The selection of the video segment may then result in management facility 102 stopping playback of the movie, storing a playback position of the media program, and facilitating access to the video segment. After presentation of the video segment associated with the actor, management facility 102 may resume playback of the movie starting from the stored playback position.

Figure 5:
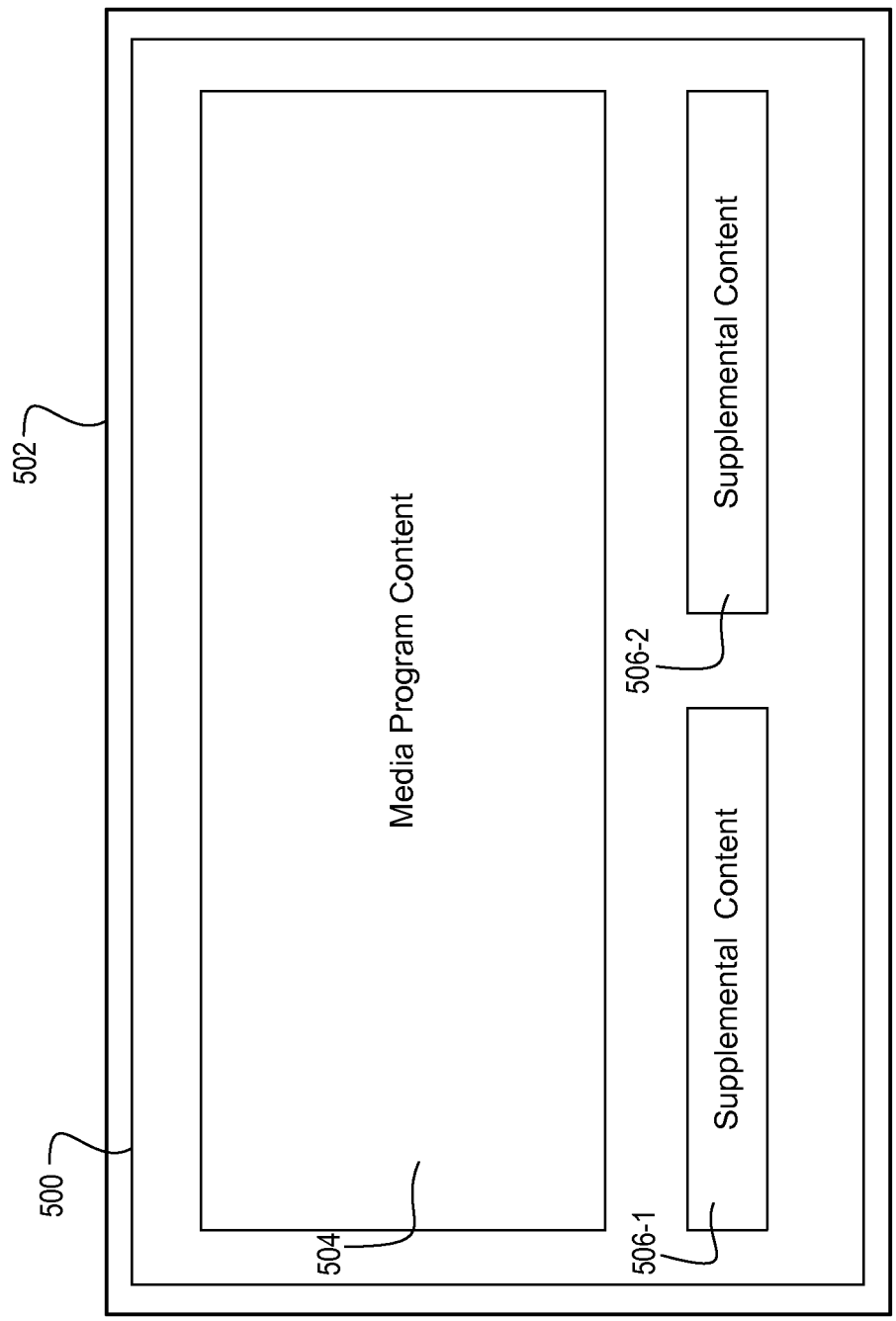

In certain examples, management facility 102 may provide content associated with more than one supplemental content stream for display concurrently during presentation of a media program. To illustrate, FIG. 5 depicts a graphical user interface view 500 ("view 500") that may be provided for display by management facility 102. View 500 may be provided for display on a display screen 502 that may be associated with a media content access device. As shown in FIG. 5, view 500 may include a media program content section 504 in which a media program represented by a streamed primary media content stream may be presented. View 500 may also include supplemental content sections 506 (e.g., supplemental content sections 506-1 through 506-2) in which supplemental content instances represented by multiple streamed supplemental content streams may be presented to a user concurrently with presentation of content moments in the media program. Media program content section 504 and supplemental content sections 506 may be provided together as illustrated in FIG. 5, or in any other suitable on-screen configuration.

In the example illustrated in FIG. 5, a primary media content stream and a plurality of supplemental content streams may be concurrently streamed to a media content access device. For example, a primary media content stream may be concurrently streamed together with a "shopping" type supplemental content stream and a "girl" type supplemental content stream. During playback of the media program in media program content section 504, a content moment may occur that is associated with a supplemental content instance in each of the "shopping" type and the "girl" type supplemental content streams. Accordingly, in such a circumstance, a supplemental content instance from the "shopping" type supplemental content stream may be displayed in supplemental content section 506-1, and a supplemental content instance from the "girl" type supplemental content stream may be displayed concurrently in supplemental content section 506-2.

Alternatively, at a given time during playback of the media program, a supplemental content instance may be displayed, for example, in supplemental content section 506-1 but not in supplemental content section 506-2, or vice versa. For example, during playback of the media program in media program content section 504, a content moment may occur. The "girl" type supplemental content stream associated with supplemental content section 506-2 may include a supplemental content instance associated with the content moment. Accordingly, the supplemental content instance may be displayed in supplemental content section 506 concurrently with the presentation of the content moment of the media program in media program content section 504. The "shopping" type supplemental content stream associated with supplemental content section 506-1 may not include a supplemental content instance associated with the content moment. Accordingly, supplemental content section 506 may be blank or filled with predetermined placeholder content when the presentation of the content moment of the media program in media program content section 504 occurs. A presentation of such content in a user interface may be transparent to a user.

In this or a similar manner, during a presentation of a primary media content stream (i.e., a presentation of a media program represented by the primary media content stream) in a user interface view, concurrent presentations of multiple supplemental content streams in the user interface view may be transparent to a user when segments of the media program outside of time periods associated with relevant content moments in the media program are being presented and may be visible to the user when the relevant content moments in the media program are being presented. For example, the presentation of a first supplemental content stream in the user interface view may be transparent to the user during a presentation of a segment of the media program that is not part of a first set of the one or more content moments in the media program and visible to the user during the presentation of the first set of the one or more content moments in the media program. In addition, the presentation of a second supplemental content stream in the user interface view may be transparent to the user during a presentation of a segment of the media program that is not part of a second set of the one or more content moments in the media program and visible to the user during the presentation of the second set of the one or more content moments in the media program.

In certain examples, management facility 102 may be configured to allow a user to preferentially turn off one or more supplemental content streams that may be concurrently streamed together with a primary media content stream. The user may disable the one or more supplemental content streams in any suitable manner. For example, the user may access a user settings interface and make a selection to disable the one or more supplemental content streams. The user may subsequently turn the one or more supplemental content streams back on at any time through the user settings interface.

Figure 6:
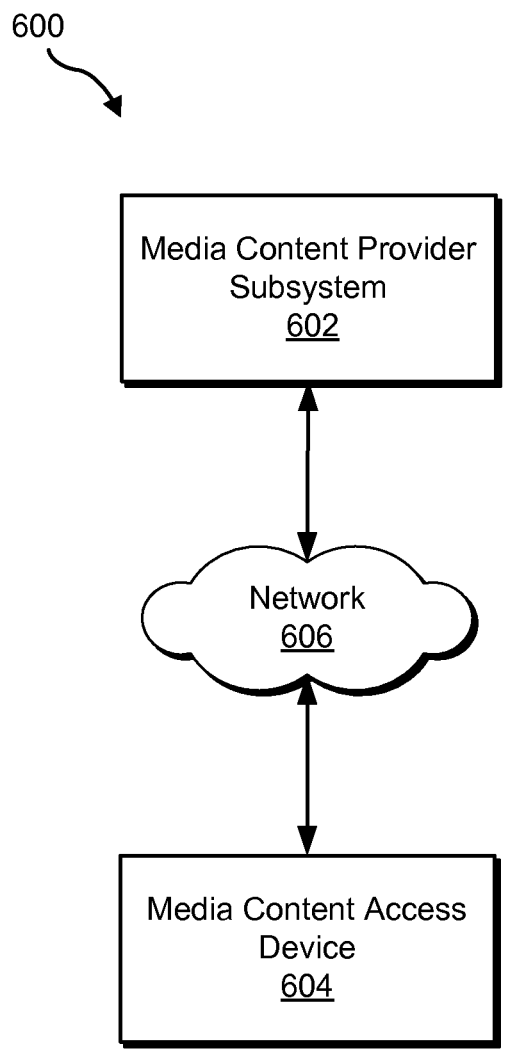
FIGS. 6-7 illustrate exemplary implementations of the system of FIG. 1 according to principles described herein.

FIG. 6 illustrates an exemplary implementation 600 of system 100 wherein a media content provider subsystem 602 is communicatively coupled to a media content access device 604 ("access device 604") by way of a network 606. Management facility 102 and storage facility 104 may each be implemented by media content provider subsystem 602 and/or access device 604.

Media content provider subsystem 602 may be associated with a media service provider (e.g., a subscriber television service provider, an on-demand media service provider, etc.). Accordingly, media content provider subsystem 602 may be configured to provide one or more media services (e.g., television services, video-on-demand services, etc.) to access device 604. For example, media content provider subsystem 602 may be configured to manage (e.g., maintain, process, distribute, and/or generate) media content (e.g., media content programs, advertisements, etc.) and/or supplemental content configured to be delivered to access device 604. Media content provider subsystem 602 may be implemented by one or more computing devices as may serve a particular implementation.

Access device 604 may facilitate access by a user to content (e.g., media content and/or supplemental content) provided by media content provider subsystem 602. For example, access device 604 may be configured to perform one or more access events at the direction of a user. To illustrate, access device 604 may present and/or record a media program at the direction of a user.

Access device 604 may include one or more user computing devices associated with a user. Examples of such devices include, without limitation, a media player computing device (e.g., a media disc player device such as a DVD or BD player device), a display device, a set-top box device, a digital video recording ("DVR") device, a computer, a tablet computer, a smart phone device, and any other device capable of accessing the media service and/or media programs provided by system 100 by way of the media service.

Media content provider subsystem 602 and access device 604 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Long Term Evolution ("LTE") technologies, Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content provider subsystem 602 and access device 604 may communicate via a network 606. Network 606 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between media content provider subsystem 602 and access device 604. Communications between media content provider subsystem 602 and access device 604 may be transported using any one of the above-listed networks, or any combination or sub-combination of the above-listed networks. Alternatively, media content provider subsystem 602 and access device 604 may communicate in another way such as by direct connections between media content provider subsystem 602 and access device 604.

In certain examples, access device 604 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. In such an example, a media program represented by a streamed primary media content stream may be presented by a primary display device, and one or more supplemental content instances represented by one or more streamed secondary content streams temporally aligned with the streamed primary media content stream may be concurrently presented by a secondary display device. For example, media program content section 506 may be displayed by the primary display device, and supplemental content section 406 may be concurrently displayed by the secondary display device. Such an example is illustrative only. Other examples of access device 604 may include any combination of user computing devices or a single user computing device configured to perform any of the user computing system and/or device operations described herein.

Figure 7:
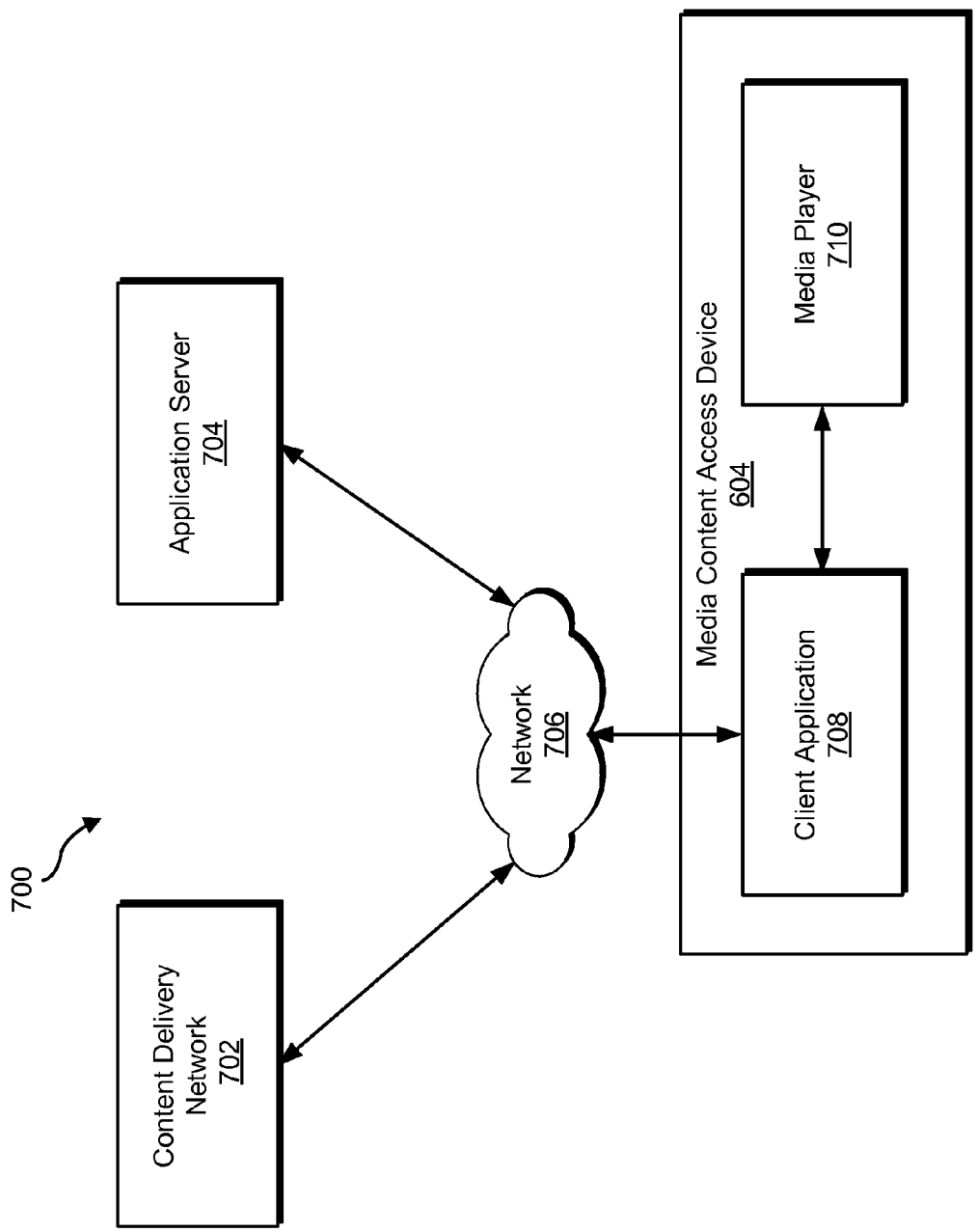

FIG. 7 illustrates an exemplary implementation 700 of system 100 wherein a content delivery network 702 and an application server 704 are communicatively coupled to access device 604 by way of a network 706. Management facility 102 and storage facility 104 may each be implemented by content delivery network 702, application server 704, and/or access device 604.

Application server 704 may be associated with a media service provider (e.g., a subscriber television service provider, an on-demand media service provider, etc.). Accordingly, application server 704 may be configured to provide one or more media services (e.g., television services, video-on-demand services, media service application services, etc.) to access device 604. For example, application server 704 may be configured to manage (e.g., maintain, process, distribute, and/or generate) media content (e.g., media content programs, advertisements, etc.) and/or supplemental content configured to be delivered to access device 604. Application server 704 may be implemented by one or more computing devices as may serve a particular implementation.

Content delivery network 702 may be configured to transmit content streams to access device 604. Content delivery network 702 may include any suitable network of devices and/or facilities, such as data centers, servers, etc. configured to transmit any of the content streams described herein to access device 604, including concurrently streaming a primary media content stream and one or more supplemental content streams to access device 604.

Content delivery network 702, application server 704, and access device 604 may communicate using any suitable communication platforms and technologies, including those described herein. In certain examples, content delivery network 702, application server 704, and access device 604 may communicate via network 706, which may include any suitable network or combination of networks, including any of those described herein.

As illustrated in FIG. 7, access device 604 may include a client application 708 and a media player 710, which may communicate with each other in any suitable way. In certain examples, client application 708 may be provided by and/or configured to communicate with application server 704. Client application 708 may facilitate a user discovering and/or streaming media programs by way of the media service. For example, through client application 708, a user may request, in any suitable manner, a media program to be streamed to access device 604. The request may be transmitted to application server 704 by way of network 708 in any suitable manner. After receiving the request, application server 708 may provide information to media player 710 to facilitate media player 710 accessing a primary media content stream and a supplemental content stream associated with the media program. For example, media player 710 may use the information provided by application server 708 to access one or more of the primary media content stream and the supplemental content stream by way of content delivery network 702. The media program included in the primary media content stream and supplemental content instances included in the supplemental content stream may then be presented to the user by way of media player 710 in any suitable manner, such as within a graphical user interface provided by client application 708.

Figure 8:
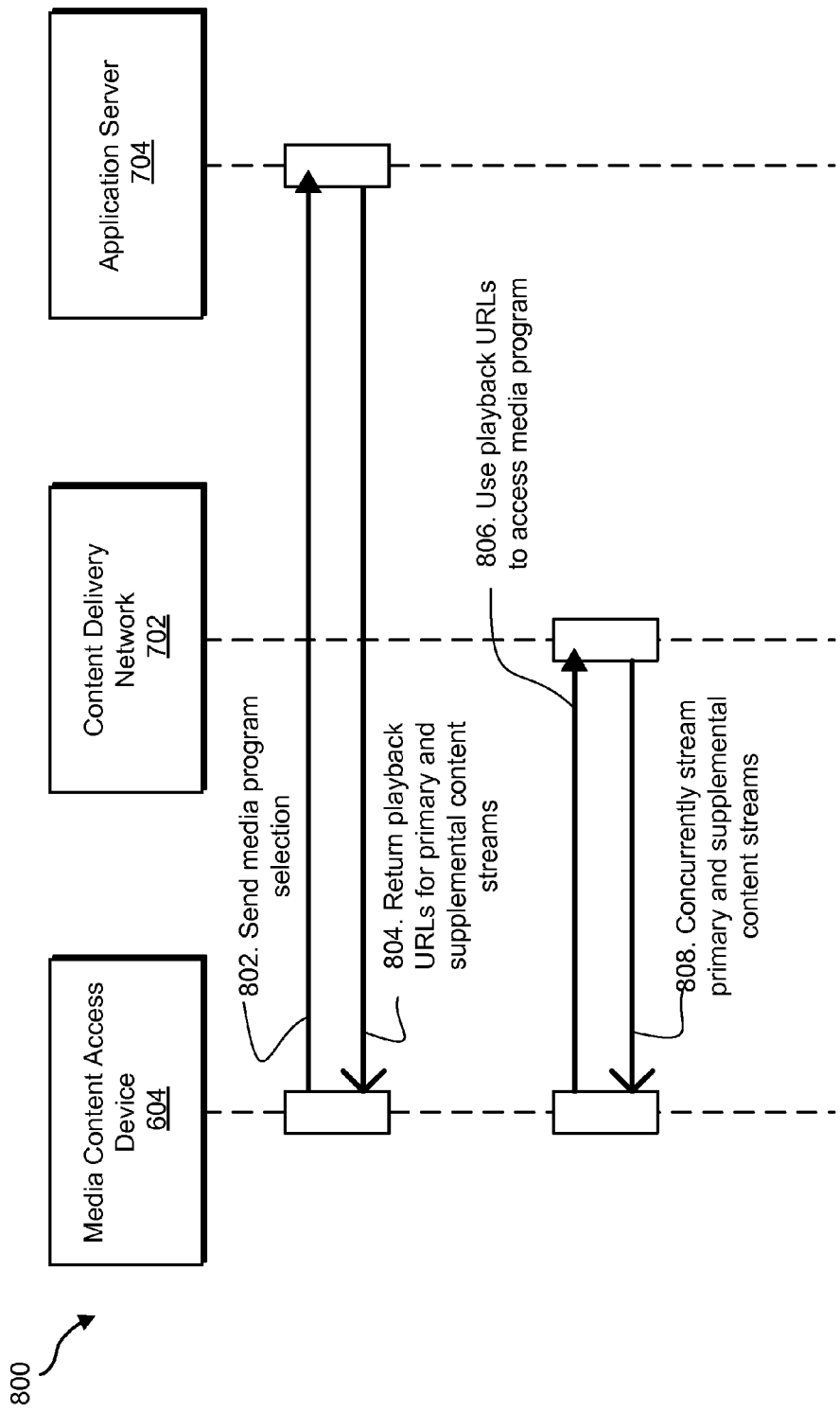
FIG. 8 illustrates an exemplary sequence diagram according to principles described herein.

In certain examples, management facility 102 may be configured to facilitate concurrent streaming of a primary media content stream and a supplemental content stream by providing a first URL associated with the primary media content stream and a second URL associated with the supplemental content stream to a media content access device. To illustrate, FIG. 8 depicts an exemplary sequence diagram 800 showing one example of how content delivery network 702, application server 704, and access device 604 may facilitate streaming of a media program to a user. Arrow 802 represents a transmission of a user selection of a media program from access device 604 to application server 704. Arrow 804 represents a transmission of a playback URL for a primary media content stream and a playback URL for a supplemental content stream from application server 704 to access device 604. Arrow 806 represents access device 604 using the URLs to access the media program from the content delivery network 702, such as by transmitting requests to access the URLs to the content delivery network 702. Arrow 808 represents content delivery network 702 concurrently streaming the primary media content stream and the supplemental content stream to access device 604.

The sequence illustrated in FIG. 8 indicates that the primary media content stream and the supplemental content stream are streamed from content delivery network 702. However, in certain other examples, the supplemental content stream and/or the primary media content stream may be streamed from application server 704 or from any other facility.

Figure 9:
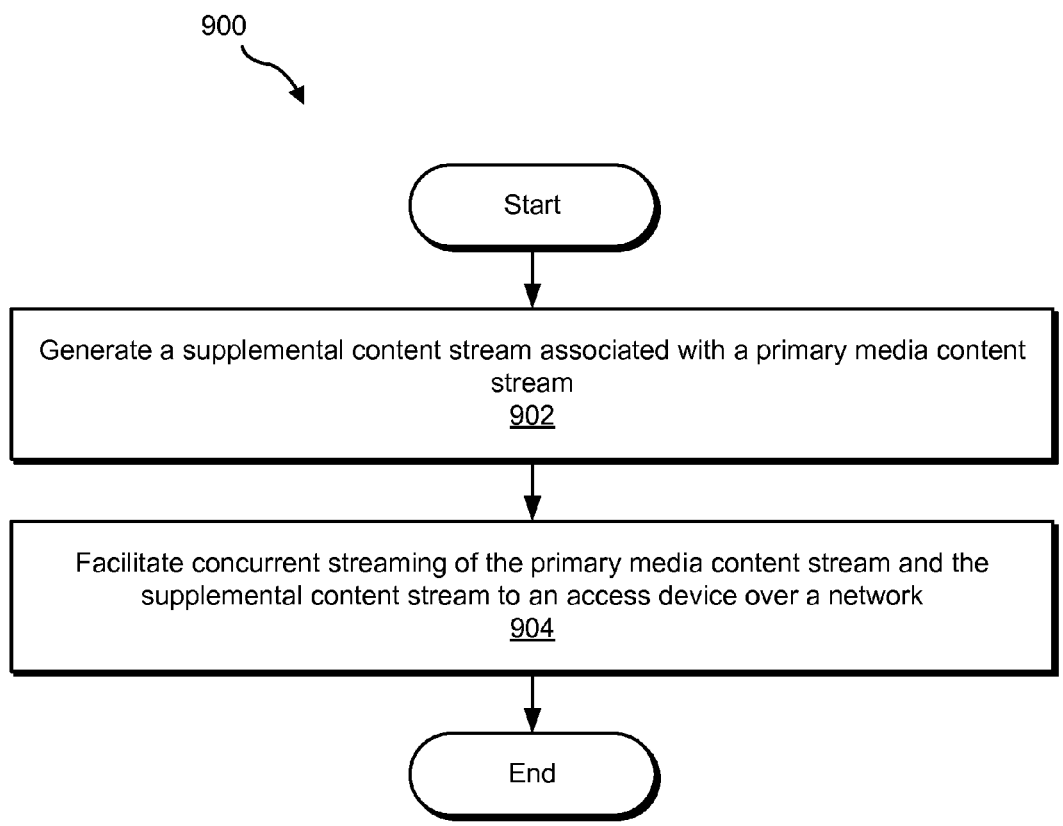
FIG. 9 illustrates an exemplary method for delivering content to a media content access device according to principles described herein.

FIG. 9 illustrates an exemplary method 900 for delivering content to a media content access device according to principles described herein. While FIG. 9 illustrates exemplary steps according to certain embodiments, other embodiments may omit, add to, reorder, combine, and/or modify any of the steps shown in FIG. 9. In certain embodiments, one or more of the steps shown in FIG. 9 may be performed by system 100 and/or one or more components or implementations of system 100.

According to method 900 illustrated in FIG. 9, in step 902, a system (e.g., system 100) generates a supplemental content stream associated with a primary media content stream, such as described herein. For example, the generating may include the system identifying, based on metadata for a media program represented by the primary media content stream, one or more content moments in the media program and creating the supplemental content stream to include one or more supplemental content instances temporally aligned with the one or more content moments.

Additionally or alternatively, the generating may include the system accessing information associated with a user of a media content access device configured to receive the primary media content stream and the supplemental content stream. The system may then identify one or more content moments in the media program that are of potential interest to the user and create the supplemental content stream to include one or more supplemental content instances temporally aligned with the one or more content moments.

In step 902, the system facilitates concurrent streaming of the primary media content stream and the supplemental content stream to a media content access device over a network, such as described herein. The primary media content stream and the supplemental content stream may be concurrently streamed in any suitable manner. For example, system 100 may provide the provide the primary media content stream and the supplemental content stream such that they are configured to facilitate concurrent, temporally aligned presentation by the media content access device of the one or more supplemental content instances and the one or more content moments during a playback of the media program by the media content access device.

While method 900 is described in terms of generating and facilitating streaming of a single supplemental content stream for a primary media content stream, this is illustrative only. The system may generate and facilitate streaming of multiple supplemental content streams for a primary media content stream in accordance with method 900.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 10:
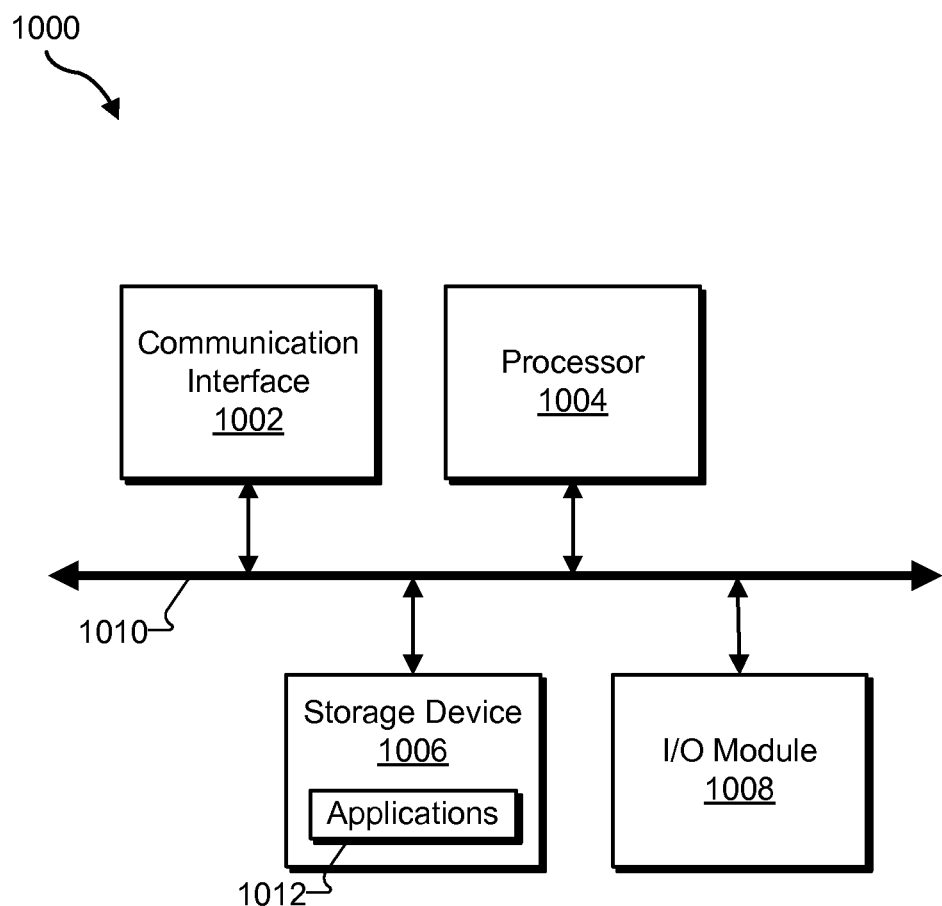
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output (I/O) module 1008 communicatively connected by way of a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more of provisioning systems by way of a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
generating, by a media content delivery system, a plurality of supplemental content streams associated with a primary media content stream, the generating comprising
identifying, based on metadata for a media program represented by the primary media content stream, one or more content moments in the media program, and
creating the plurality of supplemental content streams to each include one or more supplemental content instances temporally aligned with the one or more content moments,
wherein the plurality of supplemental content streams includes a first supplemental content stream associated with a first type of content moments and a second supplemental content stream associated with a second type of content moments;
facilitating, by the media content delivery system, concurrent streaming of the primary media content stream and the plurality of supplemental content streams to a media content access device over a network, the primary media content stream and the plurality of supplemental content streams configured to facilitate concurrent, temporally aligned presentation by the media content access device of the one or more supplemental content instances and the one or more content moments during a playback of the media program by the media content access device;
receiving, by the media content delivery system and from a user of the media content access device, a user input including an instruction to disable the second supplemental content stream;
disabling, by the media content delivery system in response to the user input, the second supplemental content stream such that the one or more supplemental content instances included in the second supplemental content stream and associated with the second type of content moments are not provided for presentation to the user; and
dynamically adjusting, by the media content delivery system while the first supplemental content stream is streamed to the media content access device, an allocation of bandwidth to the first supplemental content stream by increasing bandwidth of the first supplemental content stream at a start of a time period associated with a supplemental content instance included in the one or more supplemental content instances included in the first supplemental content stream and decreasing the bandwidth of the first supplemental content stream at an end of the time period associated with the supplemental content instance;
wherein a presentation of the first supplemental content stream in a user interface displayed in a view on a single display screen is:
transparent to the user of the media content access device during a presentation of a segment of the media program that is not part of the one or more content moments in the media program; and
visible to the user during the presentation of the one or more content moments in the media program.

2. The method of claim 1, further comprising:
receiving, by the media content delivery system from the media content access device, a request to stream the media program to the media content access device over the network,
wherein the generating of the plurality of supplemental content streams includes pre-generating the plurality of supplemental content streams prior to the receiving of the request.

3. The method of claim 1, further comprising:
receiving, by the media content delivery system from the media content access device, a request to stream the media program to the media content access device over the network,
wherein the generating of the plurality of supplemental content streams includes dynamically generating the plurality of supplemental content streams in response to the receiving of the request.

4. The method of claim 3, wherein the plurality of supplemental content streams is dynamically generated based on information associated with the user of the media content access device.

5. The method of claim 1, further comprising:
generating, by the media content delivery system, an additional supplemental content stream associated with the primary media content stream, the generating of the additional supplemental content stream comprising
identifying, based on the metadata for the media program represented by the primary media content stream, an additional content moment in the media program, and
creating the additional supplemental content stream to include an additional supplemental content instance temporally aligned with the additional content moment; and
facilitating, by the media content delivery system, streaming of the additional supplemental content stream to the media content access device over the network concurrent to the streaming of the primary media content stream and the plurality of supplemental content streams to the media content access device over the network, the primary media content stream and the additional supplemental content stream configured to facilitate concurrent, temporally aligned presentation by the media content access device of the additional supplemental content instance and the additional content moment during the playback of the media program by the media content access device.

6. The method of claim 5, wherein a presentation of the additional supplemental content stream in the user interface is:
transparent to the user of the media content access device during a presentation of a segment of the media program that is not part of the additional content moment in the media program; and visible to the user during the presentation of the additional content moment in the media program.

7. The method of claim 1, wherein the one or more supplemental content instances include one or more of an advertisement, a recommendation to explore additional content associated with the media program, and information associated with the media program.

8. The method of claim 1, wherein the one or more supplemental content instances comprise images configured to be presented in the user interface during presentation, in the user interface, of the one or more content moments in the media program represented by the primary media content stream.

9. The method of claim 1, further comprising facilitating, by the media content delivery system, access to content associated with the supplemental content instance included in the one or more supplemental content instances included in the first supplemental content stream based on a user selection of the supplemental content instance.

10. The method of claim 9, wherein the facilitating of the access to the content associated with the supplemental content instance comprises:
stopping a playback of the media program by way of the media content access device,
storing, based on the stopping, a playback position of the media program,
facilitating, after the stopping, a playback of the content associated with the supplemental content instance by way of the media content access device, and
facilitating, after the presentation of the content and based on the stored playback position, a resumption of the playback of the media program by way of the media content access device.

11. The method of claim 1, further comprising:
receiving, by the media content delivery system from the media content access device, a request to stream the media program to the media content access device over the network;
wherein the facilitating of the concurrent streaming of the primary media content stream and the plurality of supplemental content streams further comprises providing, by the media content delivery system, a first URL associated with the primary media content stream, a second URL associated with the first supplemental content stream, and a third URL associated with the second supplemental content stream to the media content access device in response to the request.

12. The method of claim 1, embodied as computer-executable instructions on at least one non-transitory computer-readable medium.

13. A method comprising:
generating, by a media content delivery system, a first supplemental content stream associated with a primary media content stream, the first supplemental content stream including a first set of one or more supplemental content instances temporally aligned with a first set of one or more content moments included in a media program represented by the primary media content stream, the first supplemental content stream associated with a first type of content moments;
generating, by the media content delivery system, a second supplemental content stream associated with the primary media content stream, the second supplemental content stream including a second set of one or more supplemental content instances temporally aligned with a second set of one or more content moments included in the media program represented by the primary media content stream, the second supplemental content stream associated with a second type of content moments;
facilitating, by the media content delivery system, concurrent streaming of the primary media content stream, the first supplemental content stream, and the second supplemental content stream to a media content access device over a network, the primary media content stream, the first supplemental content stream, and the second supplemental content stream configured to facilitate concurrent, temporally aligned presentation by the media content access device of the primary media content stream, the first supplemental content stream, and the second supplemental content stream in a user interface displayed in a view on a single display screen;
receiving, by the media content delivery system and from a user of the media content access device, a user input including an instruction to disable the second supplemental content stream;
disabling, by the media content delivery system in response to the user input, the second supplemental content stream such that the one or more supplemental content instances included in the second supplemental content stream and associated with the second type of content moments are not provided for presentation to the user; and
dynamically adjusting, by the media content delivery system while the first supplemental content stream and the second supplemental content stream are streamed to the media content access device, an allocation of bandwidth to the first supplemental content stream by increasing bandwidth of the first supplemental content stream at a start of a time period associated with a supplemental content instance included in the first set of one or more supplemental content instances and decreasing the bandwidth of the first supplemental content stream at an end of the time period associated with the supplemental content instance;
wherein the presentation of the first supplemental content stream in the user interface is:
transparent to a user of the media content access device during a presentation of a segment of the media program that is not part of the first set of the one or more content moments in the media program, and
visible to the user during the presentation of the first set of the one or more content moments in the media program; and
wherein, prior to the disabling of the second supplemental content stream, the presentation of the second supplemental content stream in the user interface is:
transparent to the user of the media content access device during a presentation of a segment of the media program that is not part of the second set of the one or more content moments in the media program; and
visible to the user during the presentation of the second set of the one or more content moments in the media program.

14. The method of claim 13, embodied as computer-executable instructions on at least one non-transitory computer-readable medium.

15. The method of claim 13, wherein the first supplemental content stream is directed towards a first defined class of users and the second supplemental content stream is directed towards a second defined class of users.

16. A system comprising:
at least one physical computing device including a processor communicatively coupled to a memory; and
a content management facility that is communicatively coupled to the processor and that directs the processor to
generate a plurality of supplemental content streams associated with a primary media content stream by
identifying, based on metadata for a media program represented by the primary media content stream, one or more content moments in the media program, and
creating the plurality of supplemental content streams to each include one or more supplemental content instances temporally aligned with the one or more content moments,
wherein the plurality of supplemental content streams includes a first supplemental content stream associated with a first type of content moments and a second supplemental content stream associated with a second type of content moments;
facilitate concurrent streaming of the primary media content stream and the plurality of supplemental content streams to a media content access device over a network, the primary media content stream and the plurality of supplemental content streams configured to facilitate concurrent, temporally aligned presentation by the media content access device of the one or more supplemental content instances and the one or more content moments during a playback of the media program by the media content access device;
receive, from a user of the media content access device, a user input including an instruction to disable the second supplemental content stream;
disable, in response to the user input, the second supplemental content stream such that the one or more supplemental content instances included in the second supplemental content stream and associated with the second type of content moments are not provided for presentation to the user; and
dynamically adjust, while the first supplemental content stream is streamed to the media content access device, an allocation of bandwidth to the first supplemental content stream by increasing bandwidth of the first supplemental content stream at a start of a time period associated with a supplemental content instance included in the one or more supplemental content instances included in the first supplemental content stream and decreasing the bandwidth of the first supplemental content stream at an end of the time period associated with the supplemental content instance;
wherein a presentation of the first supplemental content stream in a user interface displayed in a view on a single display screen is:
transparent to a user of the media content access device during a presentation of a segment of the media program that is not part of the one or more content moments in the media program; and
visible to the user during the presentation of the one or more content moments in the media program.

17. The system of claim 16, wherein the content management facility directs the processor to generate the plurality of supplemental content streams based on information associated with the user of the media content access device.

18. The system of claim 16, wherein the content management facility further directs the processor to:
generate an additional supplemental content stream associated with the primary media content stream, the additional supplemental content stream including an additional supplemental content instance temporally aligned with an additional content moment included in the media program; and
facilitate, by the media content delivery system, streaming of the additional supplemental content stream to the media content access device over the network concurrent to the streaming of the primary media content stream and the plurality of supplemental content streams to the media content access device over the network, the primary media content stream and the additional supplemental content stream configured to facilitate concurrent, temporally aligned presentation by the media content access device of the additional supplemental content instance and the additional content moment during the playback of the media program by the media content access device.

19. The system of claim 18, wherein a presentation of the additional supplemental content stream in the user interface is:
transparent to the user of the media content access device during a presentation of a segment of the media program that is not part of the additional content moment in the media program; and
visible to the user during the presentation of the additional content moment in the media program.

* * * * *